United States Patent [19]

Schaar

[11] 4,391,578
[45] Jul. 5, 1983

[54] MACHINE FOR THE PRODUCTION OF HOLLOW ARTICLES IN AT LEAST ONE MULTIPLE MOLD

[75] Inventor: Lothar Schaar, Heuerssen, Fed. Rep. of Germany

[73] Assignee: Hermann Heye, Obernkirchen, Fed. Rep. of Germany

[21] Appl. No.: 184,891

[22] Filed: Sep. 8, 1980

Related U.S. Application Data

[60] Continuation of Ser. No. 955,474, Oct. 26, 1978, abandoned, which is a division of Ser. No. 900,770, Apr. 27, 1978, abandoned.

[30] Foreign Application Priority Data

May 5, 1977 [DE] Fed. Rep. of Germany ....... 2720129

[51] Int. Cl.$^3$ .................. B29C 17/07; C03B 9/193
[52] U.S. Cl. .................................. 425/525; 65/229; 65/241; 264/523; 264/538; 425/534; 425/538; 425/324.1
[58] Field of Search ............... 425/530, 534, 538, 540, 425/525, 324.1; 65/79, 229, 240, 241; 264/523, 530, 535, 537, 538, 539, 540, 541, 542, 543

[56] References Cited

U.S. PATENT DOCUMENTS

| 2,579,399 | 12/1951 | Ruekberg | 264/543 X |
|---|---|---|---|
| 3,644,111 | 2/1972 | Becker | 65/241 X |
| 3,759,686 | 9/1973 | Trahan | 65/167 |
| 3,778,213 | 12/1973 | Di Settembrini | 264/543 X |
| 3,848,042 | 11/1974 | Shelby | 264/543 X |
| 4,010,021 | 3/1977 | Foster | 65/229 |
| 4,106,886 | 8/1978 | Sokolow | 425/534 X |
| 4,140,468 | 2/1979 | Duga | 425/534 |

Primary Examiner—Jan H. Silbaugh
Attorney, Agent, or Firm—Michael J. Striker

[57] ABSTRACT

A method for producing hollow articles from, for instance, plastic or glass in viscous condition by means of at least one multiple mold comprising a plurality of mold elements into which gobs of the material are introduced and subsequently formed and expanded to finished hollow articles during a molding cycle, and in which the center distances of the plurality of mold elements or of part thereof are changed during each molding cycle; and a machine for carrying out the method.

1 Claim, 11 Drawing Figures

Fig. 4
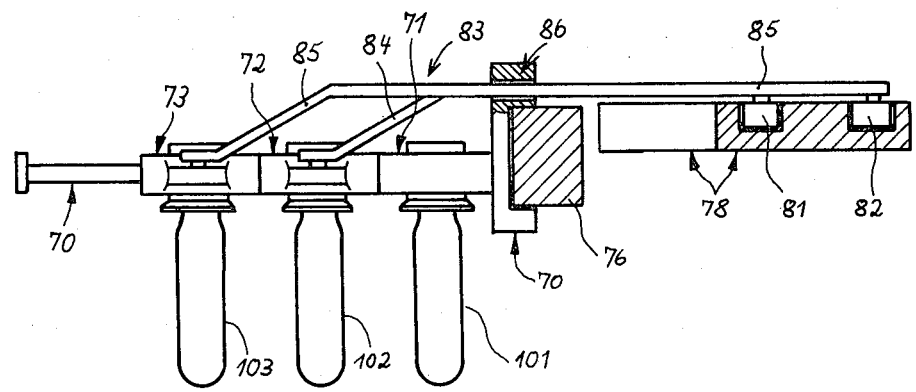
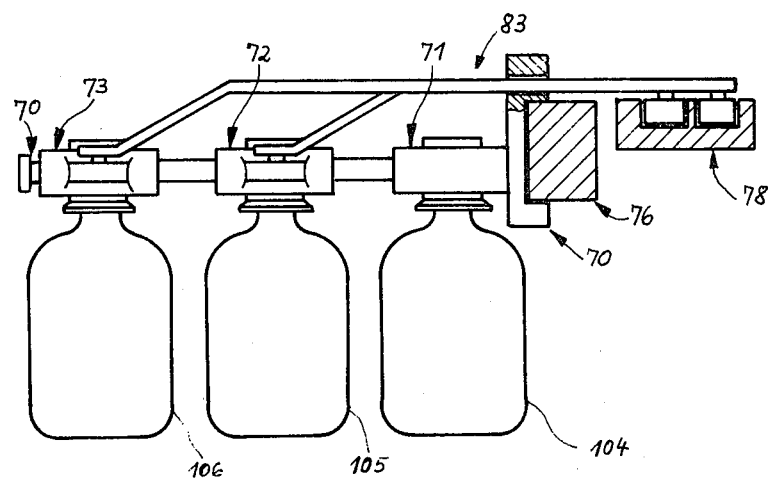
Fig. 5

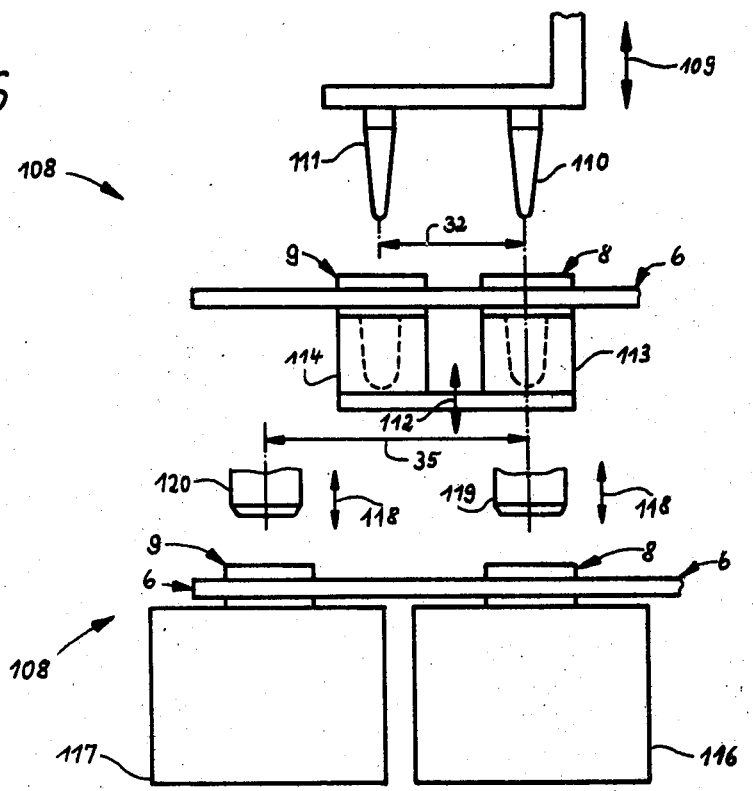
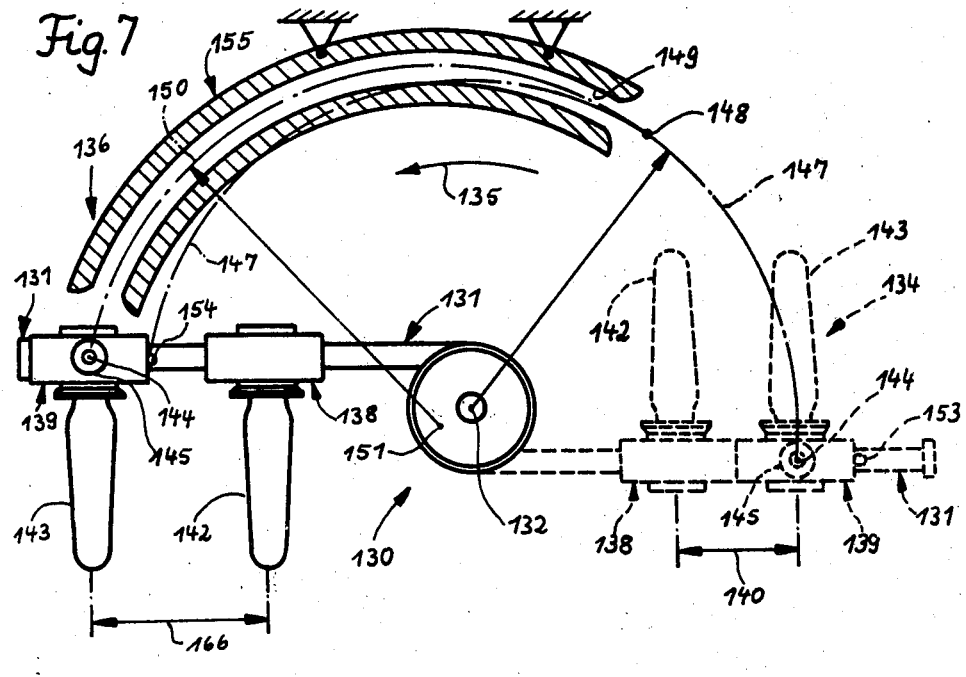

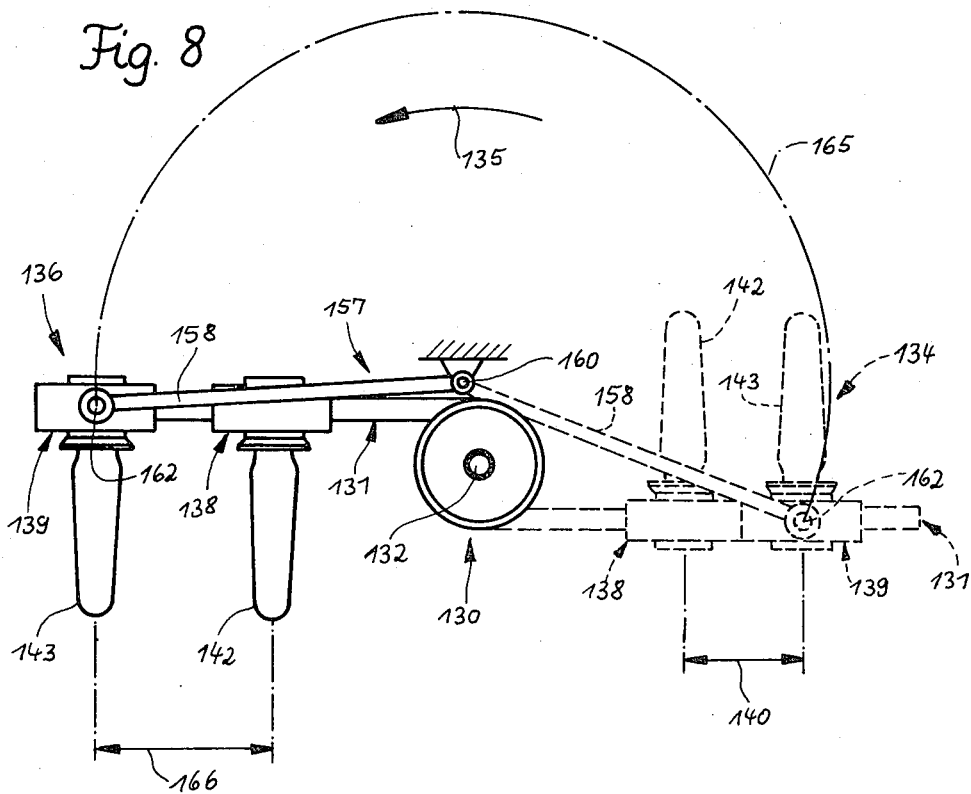
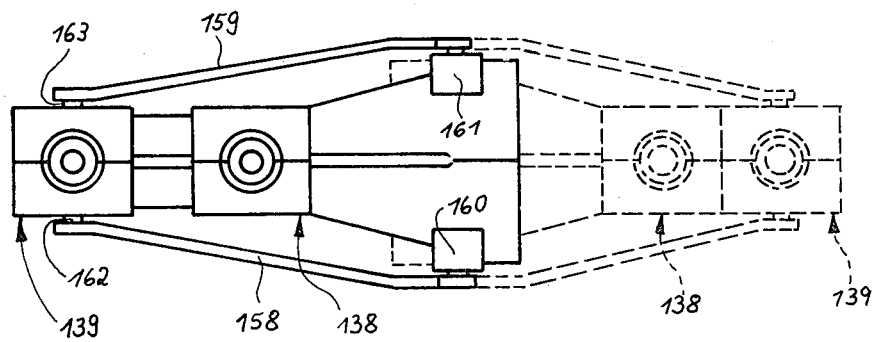

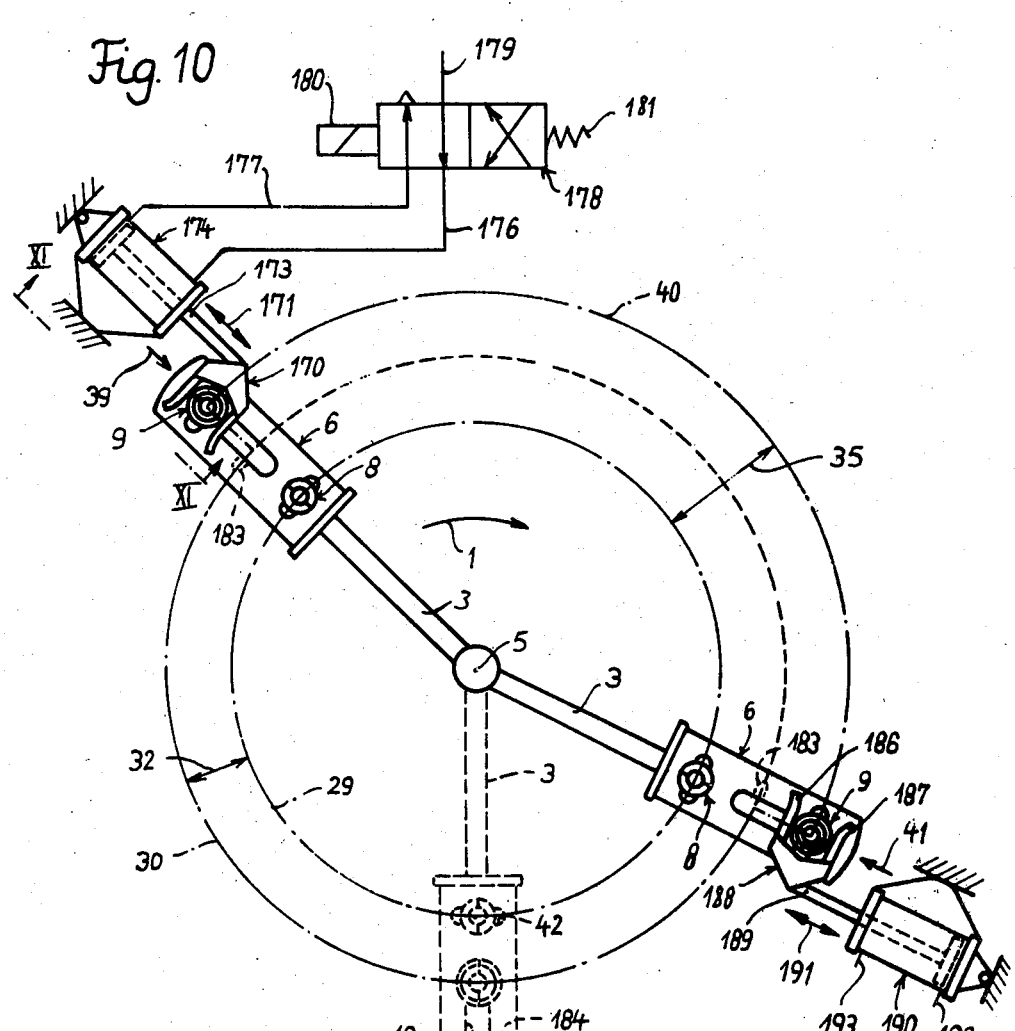
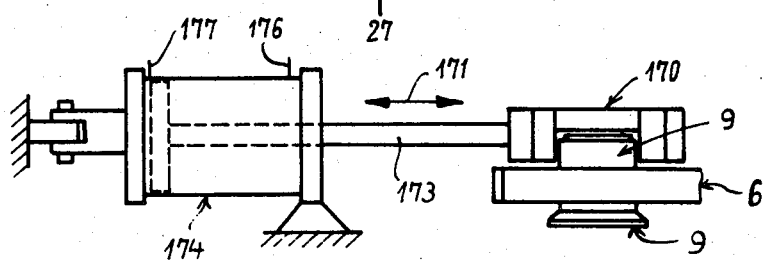

MACHINE FOR THE PRODUCTION OF HOLLOW ARTICLES IN AT LEAST ONE MULTIPLE MOLD

This is a continuation of application Ser. No. 955,474, filed Oct. 26, 1978, now abandoned which in turn is a division of application Ser. No. 900,770, filed Apr. 27, 1978 and now abandoned.

BACKGROUND OF THE INVENTION

The present invention relates to a method and machine for the production of hollow articles from, for instance, plastic or glass in viscous condition, with at least one multiple mold comprising a plurality of mold elements into which gobs of plastic material are introduced into the mold elements to be subsequently formed and expanded to finished hollow articles.

In a known method of the aforementioned kind disclosed for instance in FIGS. 7 and 8 of U.S. Pat. Nos. 3,951,637 and 4,057,412 of the same inventor, the center distance of the mold elements of each multiple mold remains constant during the whole operating cycle. The magnitude of this distance depends on the maximum transverse dimension, for instance, the diameter of the finished hollow article. During the last years the center distance of mold elements of multiple molds in machines for the production of hollow glass articles has been continuously increased because such glass articles have been produced with ever increasing transverse dimensions. This, however, entailed a corresponding considerable increase of the necessary expenditure, the necessary operating force and the required space for the total machine. It should be noted that in such machines the relatively large center distance of the mold elements of the multiple mold is only necessary during the final phase of the production of the hollow glass articles, that is when the latter reach their maximum transverse dimensions. In all preceding phases of the operating cycle, such a large center distance which requires the aforementioned high expenditure, driving force and space requirement are not necessary. It is further of disadvantage that the known machines have to be designed for a hollow article with a predetermined maximum transverse dimension. If it is now desired to produce hollow articles of a transverse dimension greater than the predetermined maximum transverse dimension, then it has up to now been the practice to reduce the wall thickness of the finish molds below the optimum value. This, in turn created thermal and technological problems leading to defects in the finished articles.

SUMMARY OF THE INVENTION

It is therefore an object of the present invention to reduce the necessary constructional, operational, operating power and the space requirements for the production of hollow articles and to make it possible to produce hollow articles of different maximum transverse dimension in one and the same machine.

With these and other objects in view, which will become apparent as the description proceeds, the method according to the present invention for producing hollow articles from plastic materials with at least one multiple mold having a plurality of mold elements, mainly comprises the steps of feeding during a molding cycle a gob of plastic material into each of the mold elements and subsequently forming and expanding the gob to a finished hollow article, and changing the distance of the centers of the mold elements or of part thereof from each other during the molding cycle from a starting magnitude and back to said starting magnitude. In this way, it is possible to adapt the center distance of the plurality of mold elements in each phase of the operating cycle to the necessary requirements. Thereby it es possible to essentially reduce the space requirement, the necessary operating power and the total structural and operational expenditure as compared with known methods. This permits also to change over a machine for the production of hollow articles of different maximum transverse dimensions in a quick and easy manner.

According to one form of the execution of the present invention, the distance of the centers is changed during the molding cycle in a plurality of steps. In this way it is possible to adapt the center distance to the increasing transverse dimensions of the hollow articles during subsequent manufacturing phases.

During a molding cycle which includes the step of performing the articles in which preforming mold elements are closed and thereafter opened, and subsequently finish forming the article in which finish forming mold elements are closed and thereafter opened, the distances between the centers of the mold elements or of part thereof of each multiple mold are increased after the preforming is finished and after the opening of the preforming mold elements and before the expansion of the articles is terminated, and wherein said center distances are returned to their starting magnitudes after the finish forming is terminated and after the finish forming mold elements are opened and before the preforming mold elements are closed.

If the molding cycle includes at least one intermediate forming step between the preforming and the finish forming steps, in which the article is partly expanded in the at least one intermediate forming step, the center distances of the mold elements are respectively correspondingly stepwise increased. Such an intermediate forming step may for instance be carried out by an intermediate blowing operation in which the transverse dimension of the parison is increased. The center distance of the mold elements of the multiple mold may again be increased after opening of the finish forming mold elements. This is for instance necessary if a part with a greater transverse dimension than the maximum transverse dimension of the hollow article has to be connected to the latter. An example for such an operation is for instance the connection of a foot of relatively large diameter onto a drinking glass. The renewed increase of the center distances may also be necessary if the finished hollow article is subjected to a special aftertreatment, for instance by covering it with a protective layer.

The present invention relates also to a machine for the production of hollow articles from gobs of for instance plastic or glass in viscous condition and having at least one multiple mold comprising a plurality of mold elements.

In a known method of this type disclosed in the aforementioned U.S. Pat. Nos. 3,951,637 and 4,057,412 there is shown in FIGS. 7 and 8 an arrangement in which the center distance of the mold elements of each multiple mold remains constant during the whole operating cycle. This entails the abovementioned disadvantages.

It is therefore also an object of the present invention to provide a machine for forming hollow articles from a gob of plastic material having at least one multiple mold having a plurality of mold elements, in which means are provided cooperating with the mold elements for changing the distance between the centers of said mold elements or of part thereof during the operating cycle.

Each mold element may comprise a neck mold and the means for changing the center distance may be adapted to change the center distance of said neck molds only. These neck molds can cooperate with other mold components, for instance a parison mold an intermediate mold and a finishing mold.

Each multiple mold may comprise a plurality of neck molds and in this construction the center distance changing means are connected to each neck mold except one of each multiple mold and each of the center distance changing means may comprise cylinder and piston means connected at one end to the machine and at the other end to the respective neck mold. The cylinder and piston means may be operated during a desired point of the operating cycle to thereby accomplish in a simple manner a displacement of the neck mold connected thereto in the desired direction to thereby change the center distances of the neck molds.

The construction may include a neck mold carrier for each multiple mold and carrying at least two neck molds, one of which is mounted in stationary position on the neck mold carrier and at least one other is mounted on the neck mold carrier movable relative to the one neck mold, and the cylinder and piston means may be connected at opposite ends to the neck mold carrier and the respective movable neck mold.

According to another modification of the machine of the present invention, each of the center distance changing means may comprise an operating rod connected at one end to the respective neck mold, a cam follower on the other end of each operating rod and cam means engaged by each of the cam followers, in which the cam means and the operating rod are movable with respect to each other in a direction transverse to the elongation of the operating rod to thereby move the respective operating rod in longitudinal direction and the neck mold connected thereto relative to one of the neck molds of each multiple mold.

According to a further embodiment of the present invention each multiple mold comprises at least two neck molds and includes a common neck mold carrier, with one of the neck molds stationarily mounted on the neck mold carrier and at least one other neck mold mounted on the neck mold carrier movable between two end positions, in which the center distance changing means comprises a cam follower on each movable neck mold, cam track means for the cam follower and arranged for engagement therewith in which the cam track means and the neck mold carrier are movable relative to each other for moving the movable neck mold between the end positions.

According to a further modification of the present invention, each multiple mold comprises at least two neck molds and a common neck mold carrier with one of the neck molds stationarily arranged on the neck mold carrier and at least one other neck mold mounted on said neck mold carrier movable relative to the one neck mold, in which the neck mold carrier is tiltable about a fixed tilting axis and in which the center distance changing means comprises a guide rod for each movable neck mold tiltably connected at one end to a fixed point located laterally of said tilting axis and on the other end tiltably connected to the respective movable neck mold.

According to a further embodiment of the present invention, each multiple mold comprises at least two neck molds and a common neck mold carrier with one of the neck molds stationarily mounted on the neck mold carrier and at least one other neck mold mounted thereon movable relative to the one neck mold, in which the neck mold carrier is movable along a predetermined path including two stations at which the neck mold carrier is brought to standstill, and in this construction the center distance changing means may comprise cylinder and piston means at each of the stations and having an operating portion connectable with the movable neck mold during the standstill of the neck mold carrier at the respective station, and control means for controlling the cylinder and piston means to move the operating portion to thereby change the distance of the center of the movable neck mold relative to that of the one neck mold during standstill of the neck mold carrier at the respective station.

The center distance changing means may move each movable neck mold and in each of the stations from one to another end position on the neck mold carrier and the latter may include means for releasably arresting the movable neck mold in either of its end positions during movement of the neck mold carrier between the stations.

All the above mentioned characteristic features apply not only to the neck molds as part of the mold elements of each multiple mold but also for the complete mold elements of each multiple mold.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a cross section taken along the line IV—IV of FIG. 3;

FIG. 5 is a cross section taken along the line V—V of FIG. 3;

FIG. 6 is a schematic illustration of a modification for a press and blow machine for the production of hollow articles;

FIG. 7 is a schematic side view of an invert mechanism of a further embodiment;

FIG. 8 is a schematic side view of another invert mechanism of an additional embodiment;

FIG. 9 is a top view of the mechanism shown in FIG. 8;

FIG. 10 is a schematic top view of a part of a machine according to an additional embodiment; and FIG. 11 is an enlarged side view of part of the machine along the line XI—XI of FIG. 10.

DESCRIPTION OF THE PREFERRED EMBODIMENTS

Figure 1:
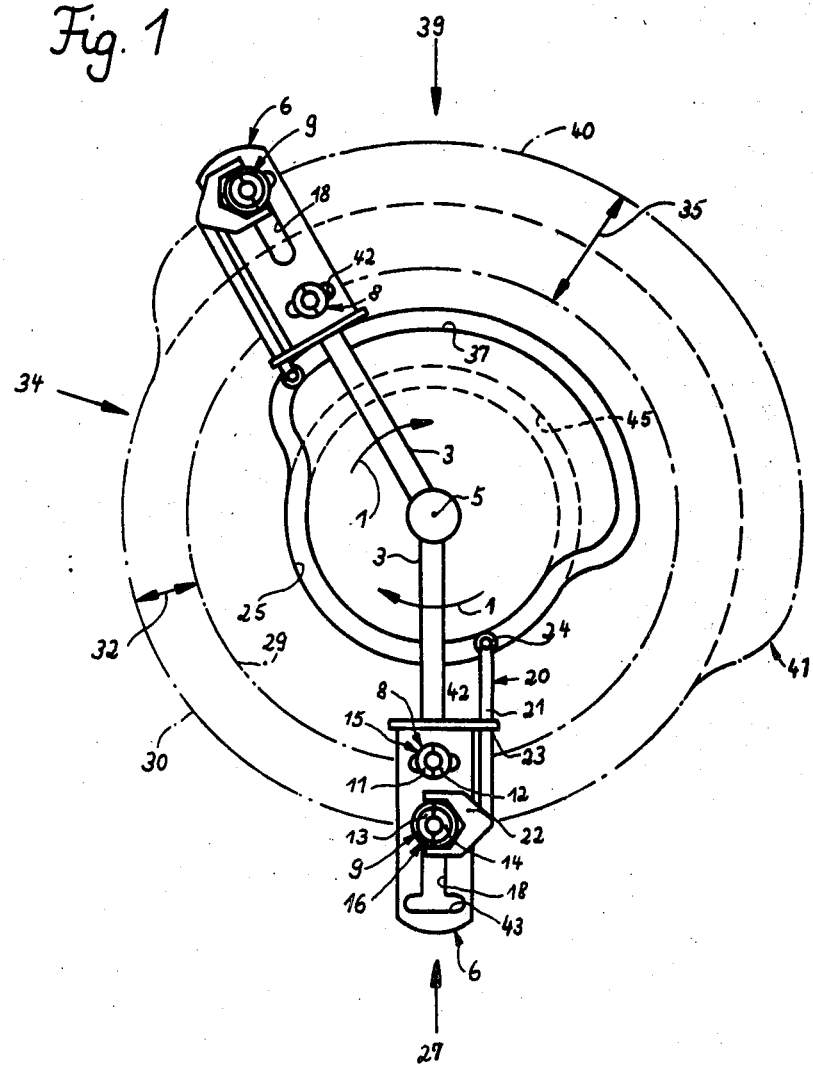
FIG. 1 is a schematic top view of part of a machine illustrating a first embodiment according to the present invention.

FIG. 1 schematically illustrates part of a machine, the details of which are disclosed in the DT-AS No. 1,704,112 and corresponding U.S. Pat. Nos. 3,644,111 and 3,839,004 which are herewith incorporated as references for showing such details. In such a machine a plurality of arms 3, here shown as two arms, are movable independent from each other in the direction of the arrows 1 about a common axis 5. The arms 3 may be moved in the aforementioned direction by any well known means connected thereto, which do not form part of the present invention and are therefore not illustrated in the drawing. Each of the arms 3 carries at the outer end thereof a neck mold carrier 6, in which two neck molds 8 and 9 are carried radially spaced from each other. Each neck mold 8 and 9 has two halves 11, 12 and 13, 14 of split neck rings 15 and 16.

Each neck mold carrier 6 is provided with a radial slot 18 in which the neck mold 9 may be moved in radial direction relative to the axis 5 by center distance changing means 20. The center distance changing means 20 comprises a fork 22 engaging the neck mold 9 and an operating rod 21 connected to the fork 22. The operating rod 21 is guided, movable in longitudinal directions, in a bearing 23 of the neck mold carrier 6 and carries at its free end thereof a roller 24 engaged in a stationary cam groove 25. The center distance changing means 20 will therefore carry out, during turning of the arm 3 about the axis 5, a displacement of the neck mold 9 along the radial slot 18 in accordance with the form of the cam groove 25.

The machine only partly and schematically illustrated in FIG. 1 is a so-called press and blow machine. In this machine the neck mold carriers 6 are operated in the following manner during an operating cycle:

A neck mold carrier 6 is arrested in a press station 27 whereby the neck molds 8 and 9 are aligned with parts of parison molds or pressmolds, not shown in FIG. 1. At the press station 27 a gob is fed in each of the parison molds and pressed by a plunger, not shown in the drawing, in a known manner into a parison engaging the respective neck mold. Subsequently thereto the neck mold carrier 6 is turned about the axis 5 in the direction of the arrow 1, whereby the neck molds 8 and 9 move along concentric circles 29 and 30 with a predetermined center distance 32 from each other up to the location 34 at which the center distance 32 is increased to a center distance 35 by increase of the radius of the circle 30. This is accomplished in that the center distance changing means 20 with its roller or cam follower 24 passes into an outwardly increased section 37 of the cam groove 25 and thus moves by means of its fork 22 the neck mold 9 radially outwardly along the radial slot 18.

The neck mold carrier 6 is then arrested at a finish forming station 39. At this station the neck molds 8 and 9 are respectively aligned with parts of finishing molds, not shown in FIG. 1. Finishing mold halves close then about the parisons hanging downwardly from the neck molds 8 and 9 and these parisons are then subsequently blown into finished hollow articles in the non-illustrated finishing molds by means of non-illustrating blowing heads, in a well known manner, respectively through the neck molds 8 and 9.

Subsequently thereto the finishing molds or blow molds are opened, in a manner known per se, and the neck mold carrier 6 is then further turned about the axis 5 with the finished hollow articles suspended on the neck molds 8 and 9. Thereby, the neck mold 8 moves further along the circle 29 and the neck mold 9 on the circle 40 of an enlarged diameter.

The neck mold carrier 6 is then arrested at a releasing station 41. At this station, the neck ring halves 11, 12 and 13, 14 are opened by moving the same by non-illustrated means, known per se, along the tangential slots 42 and 43 in the neck mold carrier 6 away from each other. Thereby the finish formed hollow articles are released in a known manner from the neck molds 8 and 9 and transported away by non-illustrated means.

During the subsequent further movement of the neck mold carrier 6 about the axis 5 in the direction of the arrow 1, the center distance 35 thereof is moved back to the starting magnitude or distance 32, while the neck molds 8 and 9 are again closed as they arrive at the press station 27, whereafter the above described operating cycle is repeated.

If in the machine schematically shown in FIG. 1 hollow articles of relatively small maximum transverse dimensions are to be produced, then a change of the minimum center distance 32 may not be necessary during the operation cycle. Such narrow articles may however be produced in the same machine. It is then only necessary to change the cam groove 25 to a cam groove 45, indicated in dotted lines in FIG. 1, so that not only the neck mold 8 moves during the whole operating cycle along the circle 29, but also the neck mold 9 moves during the whole operating cycle on the concentric circle of larger diameter 30.

The arrangement of FIG. 1 may also be modified in that the smallest center distance 32 may be increased during the operating cycle not by increasing the diameter of the circle 30 but by decreasing the diameter of the circle 29 at the location 34. Of course, it is also possible that at the location 34 the diameter of the circle 30 is increased and simultaneously the diameter of the circle 29 is decreased.

Figure 2:
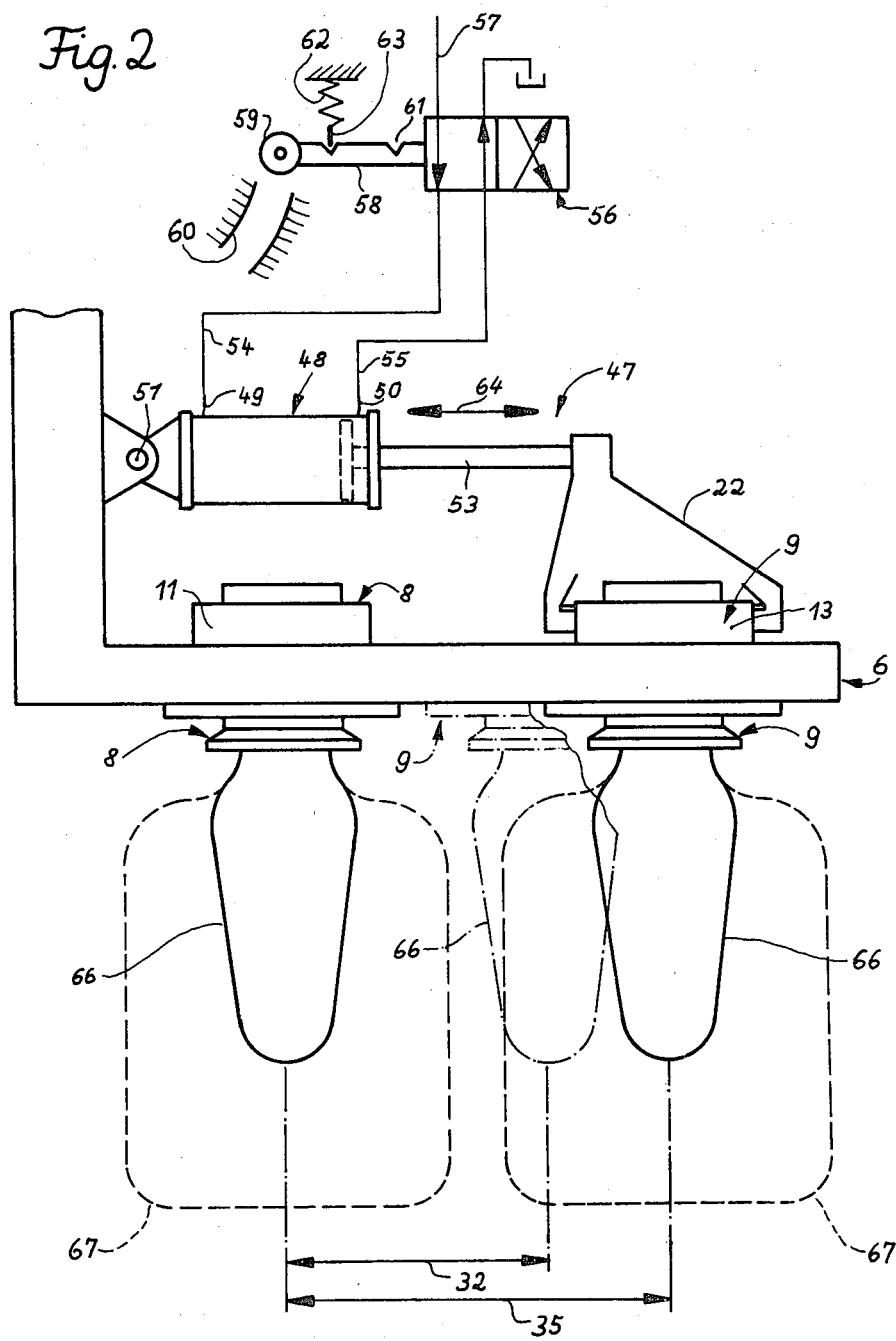
FIG. 2 is a side view of a part of the machine according to a further embodiment.

FIG. 2 schematically illustrates a modification of the machine illustrated in FIG. 1 in which the center distance changing means 47 is constituted by a double acting cylinder and piston unit 48 with fluid pressure connections 49 and 50. The unit 48 is at one end connected tiltably about an axis 51 to the neck mold carrier 6 and on the other end by means of its piston rod 53 to the fork 22 connected to the neck mold 9. The pressure fluid connections 49 and 50 are connected by means of conduits 54 and 55 with a four-port, two-position valve 56 movable with the carrier 6. Pressure fluid is fed into the valve 56 through a conduit 57. The valve 56 has an operating rod 58 with a roller follower 59 which engages in a cam groove 60 to carry thereby out a switching of the valve from one to its other position. Cam members 60 are adjustably arranged on stationary machine parts in such positions of the machine at which a change-over of the valve 56 is to be carried out. The operating rod 58 is provided with two notches 61, spaced from each other along the operating rod, into which an arresting pin 63, biased by a spring 62, may respectively engage. In this way the fork 22 may be moved in the direction of the double-headed arrow 64 by reversing the valve 56 to thereby reach the center distances 32 and 35. One part of the neck mold 9 is shown in FIG. 2 in dash-dotted lines indicating the closest position of the neck mold 9 to the neck mold 8 and in full lines in its position furthermost spaced from the neck mold 8. FIG. 2 indicates also the parisons 66 respectively suspended from the neck molds 8 and 9, which then are enlarged at the finish forming station 39, indicated in FIG. 1, to the finished hollow article 67.

Figure 3:
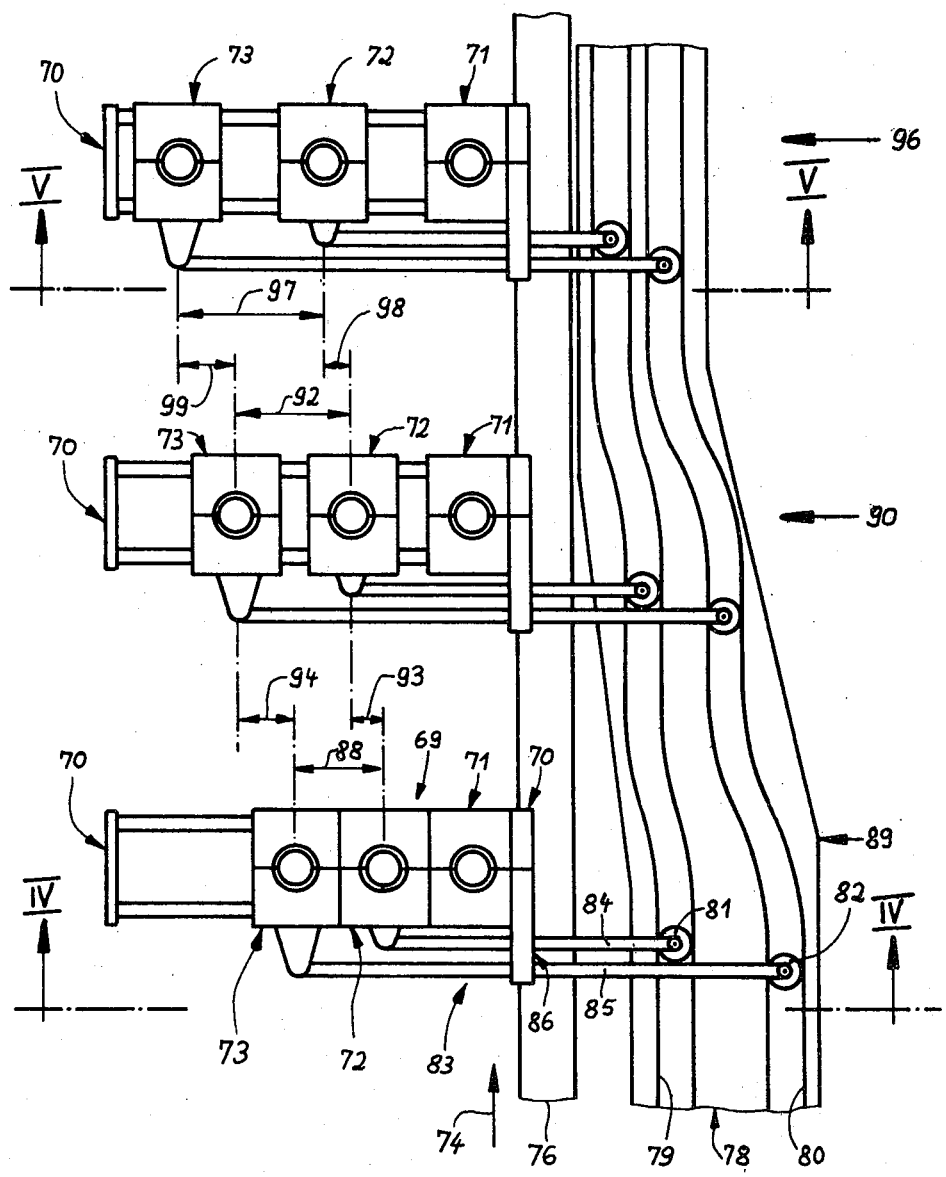
FIG. 3 is a schematic top view of part of a machine of an additional embodiment.

FIG. 3 schematically illustrates a further embodiment of the machine according to the present invention for the production of hollow glass articles according to the press and blow method. FIG. 3 illustrates a plurality of so-called triple molds 69, each including a neck mold carrier 70 on which one neck mold 71 is stationarily and two additional neck molds 72 and 73 are movably arranged. Each neck mold carrier 70 is moveable in the direction of the arrow 74 along a guide rail 76. The neck mold carriers 70 may for instance be connected by chains, not illustrated in the drawing, and by means of these chains be moved in the direction of the arrow 74, at substantially uniform distances from each other.

A cam plate 78 with two transversely spaced cam grooves 79 and 80, in which rollers 81 and 82 of a center distance changing means 83 are respectively engaged, is arranged along the guide rail 76. The rollers 81 and 82 are respectively connected to operating rods 84 and 85 which are movably mounted in a bearing 86 of the respective neck mold carrier 70, whereas the other ends of the operating rods 84 and 85 are connected to the neck mold 72, respectively 73. The cam plate 78 is stationarily arranged and causes thereby, during movement of the neck mold carrier 70 along the guide rail, a stepwise increase of the smallest center distance 88 between two adjacent neck molds 71, 72 and 72, 73. The smallest center distance 88 is maintained at a preforming station 89, in which for instance by means of block molds, not illustrated in the drawing, and arranged respectively below the neck molds 71, 72 and 73, and likewise not illustrated press plungers extending through the neck mold, gobs fed into the block molds are pressed to parisons. During this pressing process the respective neck mold carrier 70 may be arrested or be moved together with the other preforming tools mentioned above along the guide rail 76.

Immediately after the opening of the preforming tools begins the well known reheating of the parisons which causes the walls of the parisons to become again fully plastic before reaching an intermediate forming station 90. At this intermediate forming station 90 the parisons are partly enlarged in a controlled manner by blowing heads which, in a known manner, are engaged with the upper ends of the neck molds 71, 72 and 73. Thereby the bottoms of the parison may be supported by likewise not illustrated parison bottom supporting devices so as to prevent an undesired increase of the length of the parisons. In this intermediate forming station the originally smallest center distance 88 between each two adjacent neck molds has been increased to an intermediate enlarged center distance 92. Thereby, the neck mold 72 is moved relative to the neck mold 71 for a distance indicated at 93 and the neck mold 73 with respect to its original position is moved for a distance indicated at 94 toward the left, as viewed in FIG. 3.

During the further part of the operating cycle, the neck mold carrier 70 moves with the three parisons blown to an intermediate shape into a finish forming station 96 in which the parisons are encompassed by non-illustrated finish forming molds or blow mold halves to be blown to their final form by likewise not illustrated blow heads. For this purpose, the intermediate center distance between each two adjacent neck molds is again increased to the largest center mold distance 97. For this purpose the neck mold 72 is moved relative to its position at the intermediate forming station 90 through a further distance 98 and the neck mold 73 relative to its position at the intermediate forming station 90 through a further distance 99 towards the left, as viewed in FIG. 3.

The cam plate 78 as well as the guide rail 76 are only partially shown in FIG. 3. The upper broken end of the guide rail 76 and of the cam plate 78 shown in FIG. 3 may be connected by non-illustrated intermediate members to the lower ends shown in FIG. 3, so that the various neck mold carriers 70 may be continuously moved, in a known manner, from the finish forming station 96 over a non-illustrated subsequent discharge station back to the preforming station 89. At the discharge station the neck molds 71, 72 and 73 are opened in a known manner in a direction parallel to the arrow 74 until the finished hollow articles are released from the neck molds and transported away by known means, not illustrated in the drawing. The means for opening and subsequent reclosing the neck molds are for instance disclosed in the aforementioned DT-AS No. 1,704,112 and are therefore not especially illustrated or described in the present application.

Of course, it would also be possible to modify the arrangement shown in FIG. 3 by providing only a single neck mold carrier 70 which would be moved in the direction of the arrow 74 between the plurality of stations, after which the movement of the single neck mold carrier would be reversed to return to the preforming station 89 and then repeating the operating cycle.

FIG. 4 illustrates further details of the center distance changing means 83. For simplification of the illustration only the neck molds 71, 72 and 73 are illustrated in FIG. 4, whereas all other parts of the preforming molds cooperating therewith are omitted in this Figure. Parisons 101, 102 and 103 are shown in FIG. 4 respectively depending from the neck molds 71, 72 and 73, which are produced at the performing station in a known manner by a pressing operation.

In FIG. 5 are likewise only the neck molds 71, 72, 73 illustrated, whereas the other necessary parts of the finish forming molds are omitted. The neck molds 71, 72 and 73 carry respectively finished hollow articles 104, 105 and 106.

FIG. 6 schematically illustrates further parts of the double mold illustrated in FIGS. 1 and 2. The upper portion of FIG. 1 shows the two preforming molds of a double mold 108. These preforming molds comprise, in addition to the neck molds 8 and 9, press plungers 110 and 111 movable in direction of the double-headed arrow 109 and integral block molds or press molds 113 and 114 movable in the direction of the double headed arrow 112. The center distance 32 at which these preforming molds are arranged is likewise indicated in FIG. 6.

The lower part of FIG. 6 illustrates the finish forming molds comprising, in addition to the neck molds 8 and 9, two split finish forming or blow molds 116 and 117 which in a known manner are suspended in tongs and movable in a direction normal to the drawing plane, and two blow heads 119 and 120 movable in the direction of the double-headed arrow 118. The increased center distance of the neck molds 8 and 9 and the finish forming molds cooperating therewith is likewise indicated at 35.

The mold elements for the embodiment shown in FIGS. 3, 4 and 5 may be constructed in a similar manner as schematically illustrated in FIG. 6.

FIG. 7 schematically illustrates a so-called invert mechanism 130 known per se from the IS-machines. In this construction the neck mold carrier 131 is tiltable about an axis 132 during the operating cycle from a preforming station 134, illustrated in dotted lines, in the direction of the arrow 135 through 180° to the finish forming station 136 shown in full lines in FIG. 7.

After finish forming the hollow article, the neck mold carrier 131 is again moved in a direction opposite to that indicated by the arrow 135 back to the preforming station 134.

The neck mold carrier 131 carries one neck mold 138 in stationary position and an additional neck mold 139 which is movable in the longitudinal direction of the neck mold carrier 131 within certain limits. At the preforming station 134 the two neck molds 138 and 139 abut against each other and have therefore the smallest center distance 140 from each other. After parisons 142 and 143 have been pressed at the preform station 134 by the non-illustrated remaining parts of the preforming molds, the neck mold carrier 131 starts to tilt in the direction of the arrow 135, whereby the axis 144 of the roller 145 carried by the neck mold 139 moves first along a circular arc 147 about the axis 132. At a point 149 of the circular arc 147 the roller 145 enters into a groove of a stationarily arranged cam member 149. The groove in the cam member 149 extends along a circular arc 150 having its center point 151 arranged spaced from the axis 132 and having a radius which is greater than that of the circular arc 147.

During pivoting of the neck mold carrier 131 in direction of the arrow 135 about the axis 132, the roller 145 moves the neck mold 139 increasingly in radially outward direction until a non-illustrated spring biased bolt of the neck mold 139 enters into a positioning bore 153 of in the neck mold carrier 131 in the outermost end position of the neck mold 139.

During return pivoting of the neck mold holder 131 in a direction opposite to that indicated by the arrow 135, the neck mold 139 is relieved from its arrested position and moved on the neck mold carrier 131 by the roller 145 cooperating with the cam member 149 increasingly in radially inward direction until it reaches the point 148 at which the mentioned spring biased bolt of the neck mold 139 moves into an inner arresting bore 154 of the neck mold carrier 131. From this moment on the neck mold 139 moves during return movement of the neck mold carrier 131 on the circular arc 147 to the end position at the preforming station 134, shown at the right side of FIG. 7 in dotted lines. The cam member 149, the roller 145 and the arresting device with the spring biased bolt and the arresting bores 153 and 154 form in this embodiment a center distance changing mechanism 155.

FIGS. 8 and 9 illustrate a construction in which the center distance changing mechanism 157 differs from that shown in FIG. 7. In the embodiment shown in FIGS. 8 and 9 the center distance changing mechanism 157 includes guide rods 158 and 159 respectively tiltably connected at one end in stationarily arranged bearings 160 and 161 and at the other end tiltably connected to trunions 162 and 163 projecting to opposite sides from the neck mold 139. The bearings 160 and 161 are aligned with respect to each other and arranged at a distance and above the tilting axis 132. The neck mold 139 is located as shown in dotted lines to the right side of FIGS. 8 and 9 at the preforming station 134 at the smallest center distance 140 from the neck mold 138 and the two neck molds abut against each other. During pivoting of the neck mold carrier 131 in the direction of the arrow 135, the neck mold 139 moves increasingly on the neck mold carrier 131 in outward direction under the action of the guide rods 158 and 159, whereby the trunions 162 and 163 move along a circular arc 165 having its center at the common axis of the bearings 160 and 161. Thus, the neck mold 139 necessarily moves to its outermost position at the finish forming station 136 at which it has the maximum center distance 166 from the neck mold 138. During return pivoting of the neck mold carrier 131 in a direction opposite to that indicated by the arrow 135, the center distance of the two neck molds is automatically again reduced to the smallest center distance 140.

In FIGS. 10 and 11 parts identical with those shown in FIG. 1 are designated with the same reference numerals. Each arm 3 with its neck mold carrier 6 is moved from a preforming or press station 27 in the direction of the arrow 1 to a finish forming station 39 where it is arrested. As the neck mold carrier 6 moves into the finish forming station 39, the neck mold 9 enters into a fork 170 connected to one end of a piston rod 173 movable in the direction of the double headed arrow 171 of a piston cylinder unit 174. The cylinder and piston unit 174 is stationarily arranged and connected by conduits 176 and 177 with a four-port, two-position valve 178. The valve 178 is supplied with a pressure medium through a conduit 179 for the operation of the cylinder and piston unit 174. The valve 178 is moved by an electromagnet 180 to the position shown in FIG. 10 after the neck mold carrier 6 is arrested at the finish forming station 39. The electromagnet 180 is energized by means of a known control arrangement of the machine, not forming part of the present invention and therefore not illustrated in the drawing.

In the position shown in FIG. 10 of the valve 178 the conduits 179 and 176 are connected to each other so that the fork 170 is moved relative to the axis 5 in radial outward direction until the center of the neck mold 9 is likewise radially outwardly moved from the circle 30 onto the circle 40 of larger radius. The valve 178 is held by the continuously energized electromagnet 180 as long in its illustrated position until the neck mold carrier 6 has moved again in the direction of the arrow 1 out of the finish forming station 39 and out of the fork 170. Subsequently thereto the electromagent 180 is deenergized so that the valve 178, under the influence of a return spring 181, returns to its starting position in which the conduits 179 and 177 are connected with each other. Thereby, the fork 170 is returned to the circle 30 to be ready for the reception of the neck mold 9 on the neck mold carrier 6 on the next arm 3.

The neck mold 9 is releasably held in either of its two end positions in the radial slot 18 in which its center is respectively arranged on the circle 30 or 40 by arresting mechanisms 183 and 184 of known construction.

When the neck mold carrier 6 enters into the release or discharge station 41, the neck mold 9 on the circle 40 engages with tongues 186 and 187 of a fork 188 connected to the piston rod 189 of a cylinder and piston unit 190 and movable in the direction of the double headed arrow 191. The cylinder and piston unit 190 is operated in the same manner as mentioned above in connection with the unit 174 over pressure medium connections 192 and 193. In the position shown in FIG. 10, the pressure medium connection 192 is provided with a pressure medium so that the fork 188 with the neck mold 9 is moved relative to the axis 5 in radially inward direction from the circle 40 onto the circle 30 of smaller diameter whereby the arresting mechanism 183 is engaged to hold the neck mold 9 in the inner position. After the neck mold carrier 6 has moved beyond the discharge station 41, the valve for operating the unit 190 is again switched over to a starting position in which the fluid pressure connection 193 is provided with pressure fluid so that the fork 188 is returned to the position shown in FIG. 10.

FIG. 11 clearly illustrates that the fork 170 is arranged for moving the neck mold 9 relative to the axis 5 in radial direction, while letting the neck mold pass in tangential direction.

It will be understood that each of the elements described above, or two or more together, may also find a useful application in other types of method and machine for the production of hollow articles by means of at least one multiple mold differing from the types described above.

While the invention has been illustrated and described as embodied in a method and machine for the production of hollow articles from plastic or glass in viscous condition by means of at least one multiple mold comprising a plurality of mold elements and in which the center distances of the plurality of mold elements are changed during each molding cycle it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a multiple neck mold machine having a pressing station in which a gob of plastic material fed to each neck mold is transformed into a parison carried by the respective neck mold, and also a finish forming station in which each parison is formed into a hollow article of larger diameter than the parison, a combination comprising an elongated carrier; a first neck mold mounted in a stationary position on said carrier; a second neck mold mounted on said carrier and movable in longitudinal direction of the latter relative to said stationary neck mold; means for moving said carrier along a predetermined path between said pressing station and said finish forming station; means cooperating with said movable neck mold for automatically increasing the center distance between said neck molds in dependence on the movement of said carrier from said pressing to said finish forming station; said center distance increasing means including stationary cam track means and cam follower means engaged in said cam track means and connected to said movable neck mold; and wherein said means for moving said carrier along said predetermined path comprises an arm connected at one end to said carrier and being turnable at the other end about a fixed axis normal to said arm so as to move said carrier along a circular path, said cam track means being located radially inwardly of said circular path and having a first portion concentric with said axis and a second portion likewise concentric with said axis but of a different radius than said first portion, and connected at opposite ends to said first portion, said center distance increasing means including an operating rod connecting said cam follower with said movable neck mold.

* * * * *